US009019952B2

(12) United States Patent
Bai et al.

(10) Patent No.: US 9,019,952 B2
(45) Date of Patent: Apr. 28, 2015

(54) METHOD AND APPARATUS FOR FORWARDING MULTICAST TRAFFIC

(71) Applicant: Huawei Technologies Co., Ltd., Shenzhen, Guangdong (CN)

(72) Inventors: Tao Bai, Beijing (CN); Yunfu Yu, Beijing (CN); Gang Chen, Beijing (CN); Shuxue Fan, Beijing (CN); Hui Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 189 days.

(21) Appl. No.: 13/735,477

(22) Filed: Jan. 7, 2013

(65) Prior Publication Data

US 2013/0121142 A1  May 16, 2013

Related U.S. Application Data

(63) Continuation of application No. PCT/CN2011/073941, filed on May 11, 2011.

(30) Foreign Application Priority Data

Jul. 5, 2010  (CN) .......................... 2010 1 0225833

(51) Int. Cl.
*H04L 12/28* (2006.01)
*H04L 12/24* (2006.01)
(Continued)

(52) U.S. Cl.
CPC ........ *H04L 41/0654* (2013.01); *H04L 12/1868* (2013.01); *H04L 45/06* (2013.01); *H04L 45/28* (2013.01); *H04L 12/18* (2013.01)

(58) Field of Classification Search
CPC .......... H04L 12/44; H04L 12/46; H04L 12/18
USPC .......... 370/351, 389, 390, 400, 408; 709/238, 709/239, 252
See application file for complete search history.

(56) References Cited

U.S. PATENT DOCUMENTS 7,684,316 B2 *  3/2010  Filsfils et al. .................. 370/222
7,719,959 B2 *  5/2010  Shah et al. ..................... 370/220
(Continued)

FOREIGN PATENT DOCUMENTS

CN  101094175 A  12/2007
CN  101163103 A   4/2008
(Continued)

OTHER PUBLICATIONS

Communication dated Jul. 10, 2013 in connection with European Patent Application No. 11 803 097.2.
(Continued)

*Primary Examiner* — Dmitry H Levitan

(57) ABSTRACT

Embodiments of the present invention provide a method and an apparatus for forwarding multicast traffic. The method includes: receiving a third multicast join message; in response to the third multicast join message, sending a first multicast join message to a first upstream router, and establishing an active path; in response to the third multicast join message, sending a second multicast join message to a second upstream router, and establishing a standby path; and sending multicast traffic to the multicast receiver through the active path, where the standby path does not forward the multicast traffic. In the foregoing embodiments, the standby path that does not forward the multicast traffic is established beforehand, so that when a fault occurs in the active path, the standby path established beforehand can be used to forward the multicast traffic.

6 Claims, 5 Drawing Sheets

(51) Int. Cl.
*H04L 12/18* (2006.01)
*H04L 12/721* (2013.01)
*H04L 12/703* (2013.01)

(56) References Cited

U.S. PATENT DOCUMENTS

| | | | |
|---|---|---|---|
| 7,826,348 B2 * | 11/2010 | Farinacci et al. | 370/228 |
| 8,218,430 B2 * | 7/2012 | Zhao | 370/218 |
| 8,462,621 B2 * | 6/2013 | Ramakrishnan et al. | 370/217 |
| 8,526,300 B2 * | 9/2013 | Arberg et al. | 370/225 |
| 2003/0002444 A1 * | 1/2003 | Shin et al. | 370/238 |
| 2008/0130644 A1 * | 6/2008 | Shibata et al. | 370/390 |
| 2008/0267078 A1 | 10/2008 | Farinacci et al. | |
| 2009/0201803 A1 | 8/2009 | Filsfils et al. | |
| 2009/0219806 A1 * | 9/2009 | Chen et al. | 370/219 |
| 2009/0245248 A1 | 10/2009 | Arberg et al. | |
| 2012/0099422 A1 * | 4/2012 | Liu et al. | 370/221 |

FOREIGN PATENT DOCUMENTS

| | | |
|---|---|---|
| CN | 101656679 A | 2/2010 |
| CN | 101669105 A | 3/2010 |

OTHER PUBLICATIONS

Beau Williamson, "Developing IP Multicast Networks, Volume I", Chapter 3/Internet Group Management Protocol/The possibilities of IGMPv3, pp. 76-77.

Beau Williamson, "Developing IP Multicast Networks, Volume I", Chapter 2/Multicast Basics/Sparse Mode Protocols, pp. 50-53.

International Search Report dated Aug. 18, 2011 in connection with International Patent Application No. PCT/CN2011/073941.

Written Opinion of the International Searching Authority dated Aug. 18, 2011 in connection with International Patent Application No. PCT/CN2011/073941.

* cited by examiner

METHOD AND APPARATUS FOR FORWARDING MULTICAST TRAFFIC

CROSS-REFERENCE TO RELATED APPLICATIONS

This application is a continuation of International Application No. PCT/CN2011/073941, filed on May 11, 2011, which claims priority to Chinese Patent Application No. 201010225833.X, filed on Jul. 5, 2010, both of which are hereby incorporated by reference in their entireties.

TECHNICAL FIELD

Embodiments of the present invention relate to communications technologies, and in particular, to a method and an apparatus for forwarding multicast traffic.

BACKGROUND

Fast re-route (Fast Re-Route, referred to as FRR) is a network error tolerance policy. The fast re-route may protect a link or a node, and may quickly perform switchover when a fault occurs in the link or the node, so as to reduce a packet loss to the largest extent. IP FRR of unicast is that an IP routing protocol generates a preferred route (a primary route) and a corresponding backup route, so that when a fault occurs in an active path, IP traffic may be switched to a standby path for forwarding. Protocol independent multicast (Protocol Independent Multicast, referred to as PIM) FRR of multicast is that the IP FRR of unicast or a statically configured standby path is used, and the active path and the standby path simultaneously forward multicast traffic, so that when a fault occurs in the active path, the multicast traffic may be switched to the standby path for forwarding.

In a procedure of implementing the present invention, the inventors find that at least the following problem exists in the prior art: because the active path and the standby path simultaneously forward the multicast traffic, network bandwidth is wasted.

SUMMARY

Embodiments of the present invention provide a method and an apparatus for forwarding multicast traffic, which are used to solve a problem in the prior art that network bandwidth is wasted because an active path and a standby path simultaneously forward multicast traffic, so as to save the network bandwidth.

An embodiment of the present invention provides a method for forwarding multicast traffic, including:

receiving a third multicast join message;

in response to the third multicast join message, sending a first multicast join message to a first upstream router, and establishing an active path;

in response to the third multicast join message, sending a second multicast join message to a second upstream router, and establishing a standby path; and sending multicast traffic to the multicast receiver through the active path, where the standby path does not forward the multicast traffic.

An embodiment of the present invention further provides an apparatus for forwarding multicast traffic, including:

a receiving module, configured to receive a third multicast join message;

a first responding module, configured to, in response to the third multicast join message, send a first multicast join message to a first upstream router, and establish an active path;

a second responding module, configured to, in response to the third multicast join message, send a second multicast join message to a second upstream router, and establish a standby path; and a sending module, configured to send multicast traffic to the multicast receiver through the active path, where the standby path does not forward the module, configured to the multicast traffic.

It may be known from the foregoing technical solutions that, according to the embodiments of the present invention, the standby path that does not forward the multicast traffic is established beforehand, so that when a fault occurs in the active path, the standby path established beforehand can be used to forward the multicast traffic. Because the standby path does not forward the multicast traffic when the active path normally forwards the multicast traffic, double network bandwidth is not occupied, thereby saving the network bandwidth.

BRIEF DESCRIPTION OF THE DRAWINGS

To illustrate the technical solutions in the embodiments of the present invention or in the prior art more clearly, the following briefly describes accompanying drawings required for describing the embodiments or the prior art. Obviously, the accompanying drawings in the following description are merely some embodiments of the present invention, and persons of ordinary skill in the art may further obtain other drawings from these accompanying drawings without making creative efforts.

DETAILED DESCRIPTION

To make the objectives, technical solutions, and advantages of the present invention more clear, the following clearly and completely describes the technical solutions according to the embodiments of the present invention with reference to the accompanying drawings in the embodiments of the present invention. Obviously, the embodiments in the following description are part of rather than all of the embodiments of the present invention. All other embodiments obtained by persons of ordinary skill in the art based on the embodiments of the present invention without making creative efforts shall fall within the protection scope of the present invention.

Figure 1:
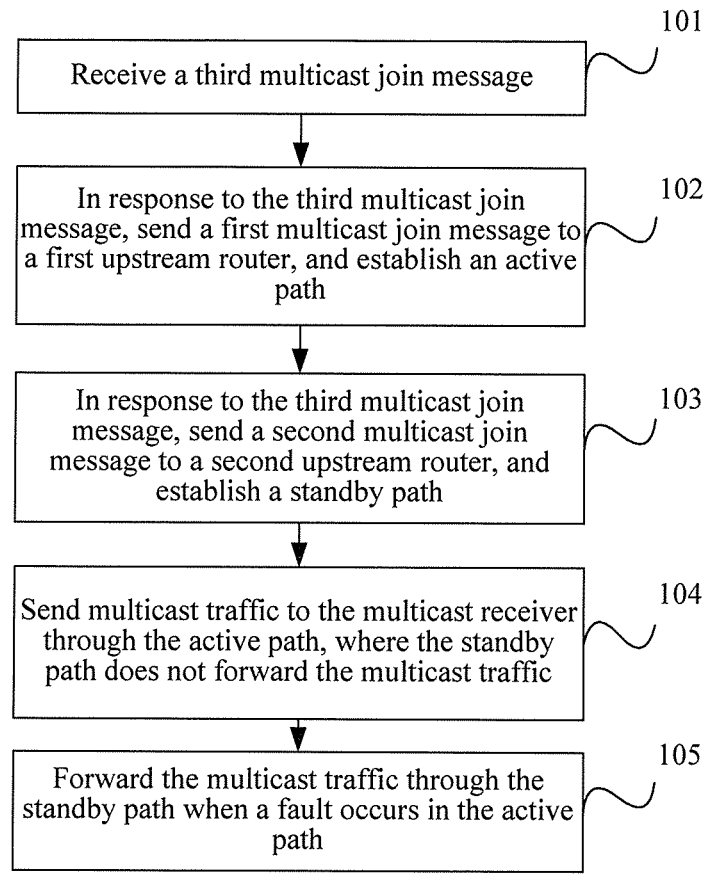
FIG. 1 is a schematic flow chart of a method for forwarding multicast traffic according to an embodiment of the present invention.

FIG. 1 is a schematic flow chart of a method for forwarding multicast traffic according to an embodiment of the present invention. As shown in FIG. 1, the method for forwarding multicast traffic in this embodiment may include:

101: Receive a third multicast join message.

102: In response to the third multicast join message, send a first multicast join message to a first upstream router, and establish an active path.

103: In response to the third multicast join message, send a second multicast join message to a second upstream router, and establish a standby path.

104: Send multicast traffic to the multicast receiver through the active path, where the standby path does not forward the multicast traffic.

The foregoing method may further include:

105: Forward the multicast traffic through the standby path when a fault occurs in the active path.

For example, in the foregoing method, it is an initiating node of the active path and the standby path that receives the third multicast join message.

For example, if no corresponding multicast entry exists on the second upstream router, the second upstream router is an intermediate node of the standby path, and the second upstream router continues to send a second multicast join message' to an upstream router of the second upstream router. For example, differences between the second multicast join message' and the second multicast join message include that addresses of upstream neighboring routers are different and source addresses are different. For another example, when the second upstream router is also an intermediate node of another standby path, differences between the second multicast join message' and the second multicast join message further include that active path information carried by the second multicast join message' not only includes active path information carried by the second multicast join message, but also includes active path information carried by another backup join packet. If an entry established because another backup multicast join message is received exists on the second upstream router, the second upstream router updates entry information, carries active path information in all backup multicast join messages, and sends the second multicast join message' to the upstream router of the second upstream router. For example, the intermediate routing node needs to send the backup multicast join message until the backup multicast join message is sent to a root node, for example, a source designated router (Designated Router, DR) or a rendezvous point (Rendezvous, RP), of a multicast tree, or until the backup multicast join message is sent to a convergence node of the active path and the standby path.

For example, the third multicast join message may be an Internet group management protocol (Internet Group Management Protocol, IGMP) membership report, a multicast listener discovery (Multicast Listener Discovery, MLD) membership report, a PIM join packet, and so on. For example, the first multicast join message and the second multicast join message may be PIM join packets.

For example, the second multicast join message may be an ordinary PIM join packet, and may also include the active path information. The active path information is used for identifying primary inbound interface information of the active path protected by the standby path. The active path information may be an identifier (for example, an IP address) of a primary inbound interface of the initiating node of the standby path, or an identifier list formed by the identifier of the primary inbound interface of the initiating node of the standby path and an identifier of a primary inbound interface of one or multiple upstream routers of the initiating node. The identifier list may be statically configured, and may also be obtained in other ways. The active path information identifies a primary inbound interface or a primary inbound interface list on the active path protected by the standby path. After receiving the second multicast join message carrying the active path information, the router on a standby path records the active path information. For example, the active path information may be recorded on an outbound interface of the router on the standby path. When a fault occurs in a primary inbound interface corresponding to an identifier of any one primary inbound interface included in the second multicast join message, the multicast traffic may be forwarded through the standby path, thereby implementing path protection. For example, in some certain situations, if the number of primary inbound interfaces protected by the standby path is very large, it may result in that too much active path information is carried in the backup join packet, thereby aggravating a burden of the router. For this problem, an update may be sent according to the PIM join packet and a changing increment of the active path information in the join packet, instead of being periodically sent, and interaction of the packets is reduced.

For example, the first multicast join message may be an ordinary PIM join packet. For another example, the first multicast join message may carry the active path information.

According to the foregoing embodiment, the standby path that does not forward the multicast traffic is established beforehand, so that when a fault occurs in the active path, the standby path established beforehand can be used to forward the multicast traffic. Because the standby path does not forward the multicast traffic when the active path normally forwards the multicast traffic, double network bandwidth is not occupied, thereby saving the network bandwidth.

Figure 2A:
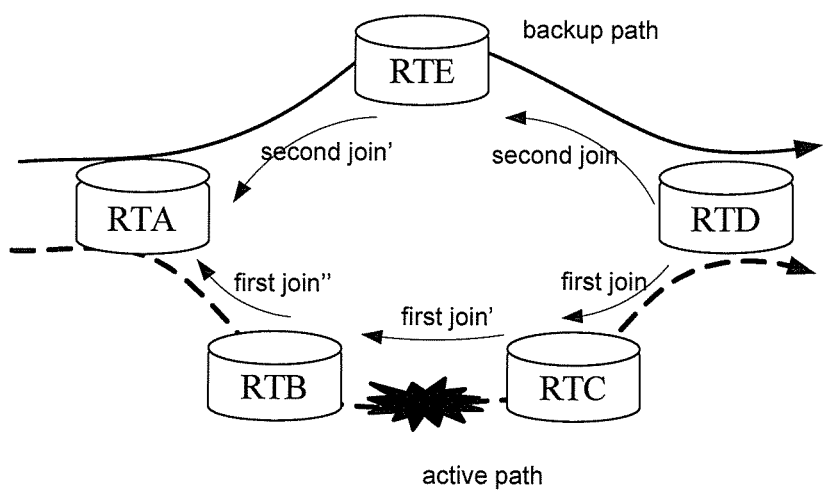
FIG. 2A is a schematic simplified structural diagram of a network topology according to another embodiment of the present invention.
Figure 2B:
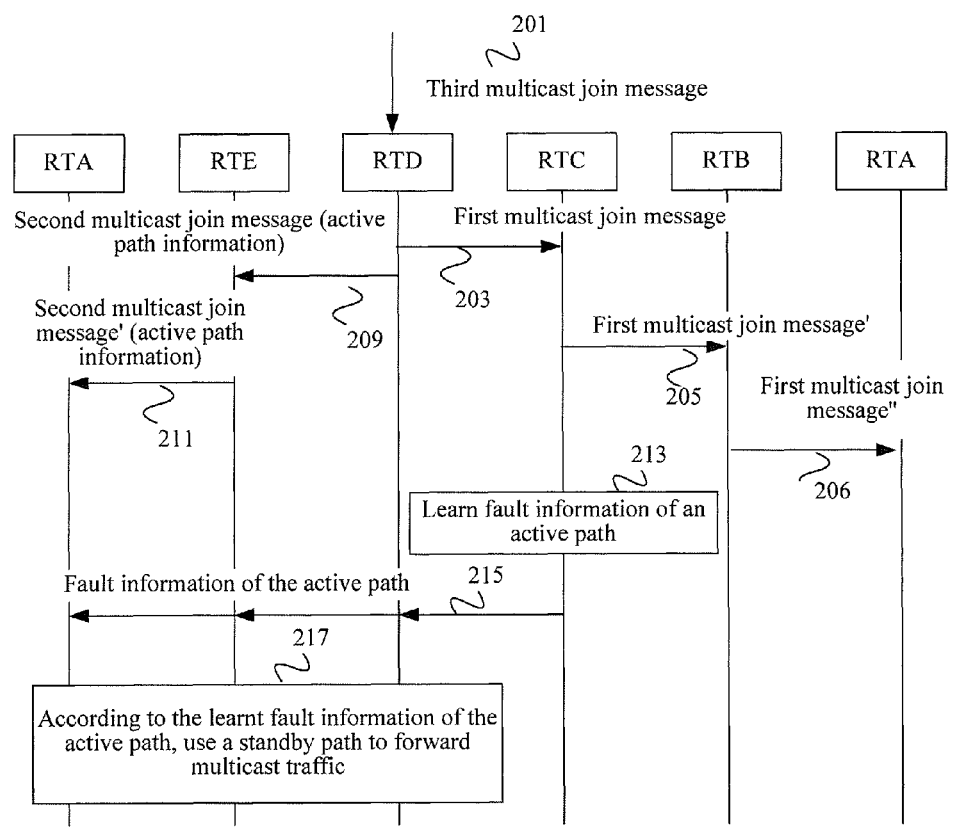
FIG. 2B is a schematic flow chart of a method for forwarding multicast traffic according to another embodiment of the present invention.

FIG. 2A is a schematic simplified structural diagram of a network topology according to another embodiment of the present invention. A router RTD is an initiating point of a standby path, and is also an initiating point of an active path. A router RTE is an upstream router of the RTD on the standby path, and is an intermediate node. A router RTA is an upstream router of the RTE on the standby path, and is a terminating node of the standby path. A router RTC is an upstream router of the RTD on the active path. A router RTB is an upstream router of the RTC on the active path. The router RTA, as the terminating node of the standby path, is also on the active path. The RTA is a convergence node of the active path and the standby path. FIG. 2B is a schematic flow chart of a method for forwarding multicast traffic according to another embodiment of the present invention. The method is based on the network topology shown in FIG. 2A. As shown in FIG. 2B, the method for forwarding multicast traffic in this embodiment may include:

201 to 206: The RTD receives a third multicast join message, sends a first multicast join message and a first multicast join message' directly to the RTA.

For example, the first multicast join message may be an ordinary PIM join packet, and an active path may be established according to a process in the prior art, and the active path may be used to forward multicast traffic, which is not repeatedly described here. For another example, the first multicast join message may carry a newly added join attribute, such as active path information. For example, differences between the first multicast join message' and the first multicast join message include that addresses of upstream neighbors routing devices are different and source addresses are different.

209: The RTD sends a second multicast join message to the RTE, where the second multicast join message includes the active path information. For example, the active path information includes identifiers of primary inbound interfaces of the RTD, the RTC, and the RTB.

The second multicast join message including the active path information may be implemented by newly defining a join attribute in a PIM join packet defined by RFC5384. The join attribute may be included in a source address in the PIM join packet. A format of the join attribute may be shown as follows:

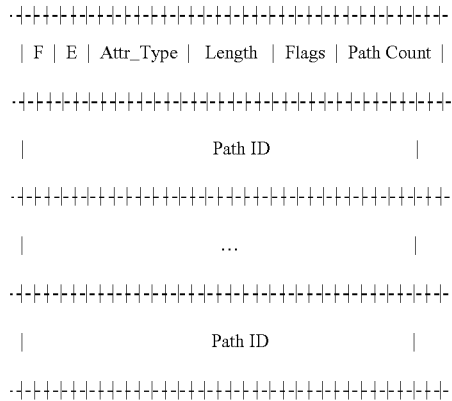

A flag bit F, a flag bit E, an attribute type (Attr_Type), and length (Length) are all defined by using a protocol standard, which are not repeatedly described here. The Attr_Type identifies that the attribute is backup joining. A flag bit Flags is content of the attribute. For example, only one bit may be used, and 1 is used to represent PIM backup joining. Path Count identifies the number of Path IDs. The Path ID identifies the active path information, and is generally an identifier (for example, an IP address) of a multicast entry primary inbound interface of a router corresponding to the active path protected by the standby path.

For example, according to a definition of an RFC5384 specification, before the router sends the PIM join packet including the backup join attribute, the router needs to first negotiate with a neighbor about whether to support processing of the PIM backup join attribute. The negotiation adopts a periodic PIM Hello packet of the router. If a Hello packet sent by a neighboring router does not include a Hello option of this PIM extended attribute, the PIM join packet including the join attribute is not continually sent. A format of the Hello option of the PIM extended attribute may be shown as follows:

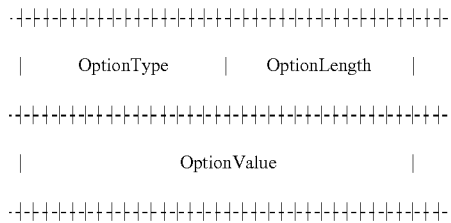

For example, an option type (OptionType) identifies that the Hello option is a newly defined Hello option of the PIM backup join attribute. Option length (OptionLength) identifies the length of the Hello option with byte as a unit. At present, the length of the hello option is fixed as 8 bytes. An option value (OptionValue) is a reserved length of 8 bytes, which is not used at present and is set as 0 in sending.

211: The RTE judges that a multicast entry created when the second multicast join message is received does not exist, and continues to send, to the RTA, a second multicast join message' including the active path information. If the RTA judges that a multicast entry created when the second multicast join message is received exists, the RTA does not continue to send a multicast join message to an upstream router.

Up to now, establishment of the standby path is completed. In a situation that the active path is normal (a fault does not occur), none of the routers on the standby path forwards the multicast traffic through a backup interface.

213: When a fault occurs in a link between the RTB and the RTC, the RTC may detect the upstream link fault through a fault detection technology and learn fault information of the active path.

Alternatively, when a fault occurs in the link between the RTB and the RTC, the RTB may also detect the downstream link fault through the fault detection technology and learn the fault information of the active path. For example, a bidirectional forwarding detection (Bidirectional Forwarding Detection, referred to as BFD) technology may be adopted to detect the link fault.

215: The RTC sends the fault information of the active path according to an identifier (for example, an IP address) of a primary inbound interface corresponding to the faulty link, where the fault information includes the identifier of the primary inbound interface corresponding to the faulty link. That is, the RTC sends the fault information of the active path to the routers RTD, RTE, and RTA on the standby path.

Alternatively, the RTB sends the fault information of the active path to the RTA on the standby path according to the identifier (for example, an IP address) of the primary inbound interface corresponding to the faulty link, where the fault information includes an identifier of a primary inbound interface of a downstream router corresponding to the faulty link, that is, an identifier of a primary inbound interface of the router RTC at the peer end.

The RTC or the RTB sends the fault information of the active path to the routers RTD, RTE, and RTA on the standby path.

In this step, the fault information of the active path may be sent to the routers RTD, RTE, and RTA on the standby path in any one of the following manners A to C.

A. The RTC or the RTB floods routers in an entire network with the fault information of the active path.

For example, the fault information of the active path may flood the entire network configured with a fault detection and transfer interface. Because a router on the standby path obtains beforehand the active path information in the second multicast join message (the backup join packet), according to the identifier of the primary inbound interface corresponding to the faulty link, where the identifier of the primary inbound interface corresponding to the faulty link is included in the fault information, a backup outbound interface corresponding to the primary inbound interface may be determined, and multicast traffic may be forwarded through the backup outbound interface. In this way, it is ensured that the multicast traffic of the faulty link can be forwarded through the standby path.

B. The RTC sends, according to a preset fault transfer policy, the fault information of the active path to the routers RTD, RTE, and RTA on the standby path through all primary outbound interfaces, or a backup inbound interface in another network topology. The router receiving the fault information determines a corresponding backup outbound interface according to the primary inbound interface corresponding to the faulty link, and forwards the multicast traffic through the backup outbound interface.

For example, in consideration of various different network topology structures, a transfer rule for the routers RTC, RTD, RTE, and RTA to transfer the fault information of the active path may be shown as follows.

If the fault information is received from a primary inbound interface, a backup inbound interface exists on the router, and the backup inbound interface does not receive any fault, the fault is transferred to the backup inbound interface; otherwise, the fault is transferred to all the outbound interfaces.

If the fault information is received from a backup outbound interface, the fault information is transferred through the primary inbound interface, and meanwhile, the backup outbound interface forwards the multicast traffic.

If the fault information is received from a primary outbound interface, the fault information is not processed, and transfer of the fault information is stopped.

If the fault information is received from a backup inbound interface, and if the primary inbound interface does not receive the fault information, the transfer of the fault information is stopped; otherwise, the fault information is transferred through all the outbound interfaces.

For example, the RTC transfers the fault information to the RTD through a primary outbound interface. The RTD receives the fault information from a primary inbound interface, and a backup inbound interface exists, then the RTD transfers the fault information to the RTE through the backup inbound interface. The RTE receives the fault information from a backup outbound interface, opens the backup outbound interface receiving the fault information, forwards the traffic, and continues to transfer the fault information to the RTA through a primary inbound interface on the standby path. After receiving the fault information from a backup outbound interface, the RTA opens the backup outbound interface receiving the fault information, forwards the traffic, and continues to transfer the fault information upward through a primary inbound interface. Until the fault information is transferred to a router directly connected to a source or is transferred to a primary outbound interface, the transfer of the fault is stopped.

C. The RTB sends, according to the preset fault transfer policy, the fault information of the active path upstream through a primary inbound interface, so that a convergence point of the standby path and the active path, that is, the router RTA, opens the backup outbound interface and forwards the multicast traffic.

For example, the RTB sends, according to an identifier of a faulty interface, the fault information to the RTA through the primary inbound interface. According to the identifier of the primary inbound interface carried in the fault information, the RTA determines the corresponding backup outbound interface, and sends the multicast traffic through the backup outbound interface. Optionally, the fault information is continually transferred in a direction facing the inbound interface until the fault information is transferred to the router directly connected to the source or is transferred to the primary outbound interface. For example, for a situation that multiple routers directly connected to the source exist, when the fault information is transferred to a router directly connected to the source, the fault information needs to be continually transferred to other routers directly connected to the source, and a backup outbound interface is opened.

The manner C is applicable to a scenario where a terminating node of the standby path is also on the corresponding active path, or is applicable to a scenario where a terminating node of the standby path is also on a router directly connected to the source. In this scenario, when a fault does not occur in the active path, optionally, if only a backup outbound interface of a router at a terminating point of the standby path is enabled not to forward the traffic, it may also be implemented that the standby path does not forward the traffic.

For example, in the foregoing various examples, the transfer of the sent fault information may be implemented by extending a fault detection protocol. A source address and identifier information of the faulty interface, that is, the primary inbound interface, may be added. Taking a BFD protocol as an example, the protocol needs to be extended as follows:

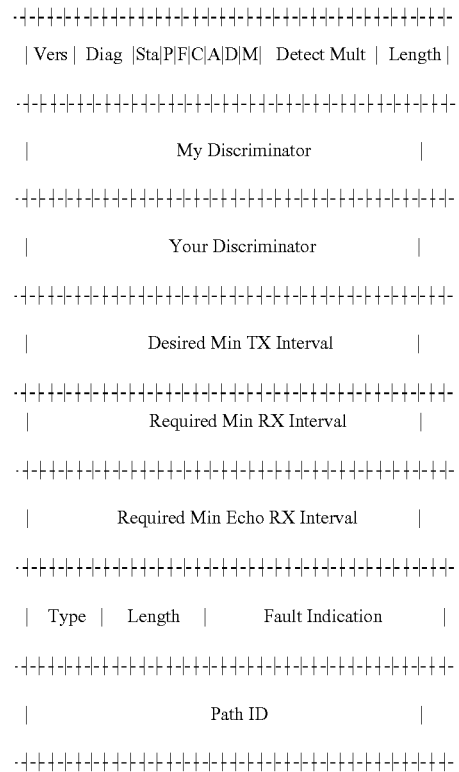

A new version number (in a Vers field) or an M bit of a BFD packet is defined to identify that this is an extended BFD packet. In a message body, Type is a type definition; Length is length of an extended part; Fault Indication is a cause for the fault, and is not used at present; Path ID indicates an identifier of a primary inbound interface of a downstream router of a faulty link; and coding formats of content in other parts are defined according to an RFC5880 standard.

217: The RTD, the RTE, and the RTA use the standby path to forward the multicast traffic according to the learnt fault information of the active path.

For example, a rule for opening the backup outbound interfaces of the RTD, the RTE, and the RTA is: because the fault information includes the identifier of the primary inbound interface corresponding to the faulty link, searching all multicast entries to determine the backup outbound interface corresponding to the identifier of the primary inbound interface, and forwarding the multicast traffic through the backup outbound interface; and if the fault information does not include an identifier of any primary inbound interface, opening all multicast backup outbound interfaces of all the multicast entries to forward the multicast traffic.

For example, the RTA forwards the multicast traffic through the backup outbound interface according to the learnt fault information of the active path. The RTE forwards the multicast traffic through the backup outbound interface according to the learnt fault information of the active path. The RTD receives the multicast traffic through the backup inbound interface according to the learnt fault information of the active path.

Optionally, it is judged whether the RTD receives the multicast traffic through the primary inbound interface of the active path, if the RTD does not receive the multicast traffic through the primary inbound interface of the active path, the traffic received through the backup inbound interface is continually forwarded downward. For example, if a fault does not occur in the link between the RTB and the RTC, but fault information of another link in the network, where the fault information of the another link in the network carries a link identifier of the primary inbound interface of the RTC, is transferred to the topology shown in FIG. 2A, it also results in that the multicast traffic is forwarded along the standby path RTA-RTE-RTD. At this time, the RTD detects the multicast traffic of the backup inbound interface, but the multicast traffic also exists at the primary inbound interface, switchover may not be performed, and a prune packet is sent to the routers RTD, RTE, and RTA on the standby path, the standby path is removed, and the backup traffic forwarded by mistake may be terminated in time. After a delay, the backup path is re-established according to the method in the foregoing embodiment.

For example, if protected primary inbound interfaces are reduced, a router sends a prune packet, where reduced active path information is carried in the sent prune packet, so as to update the primary inbound interface information corresponding to the backup outbound interface. For another example, if a certain standby path is no longer needed, the sent prune packet may not carry any active path information. An upstream router receives the prune packet, and removes the corresponding backup path.

Figure 3:
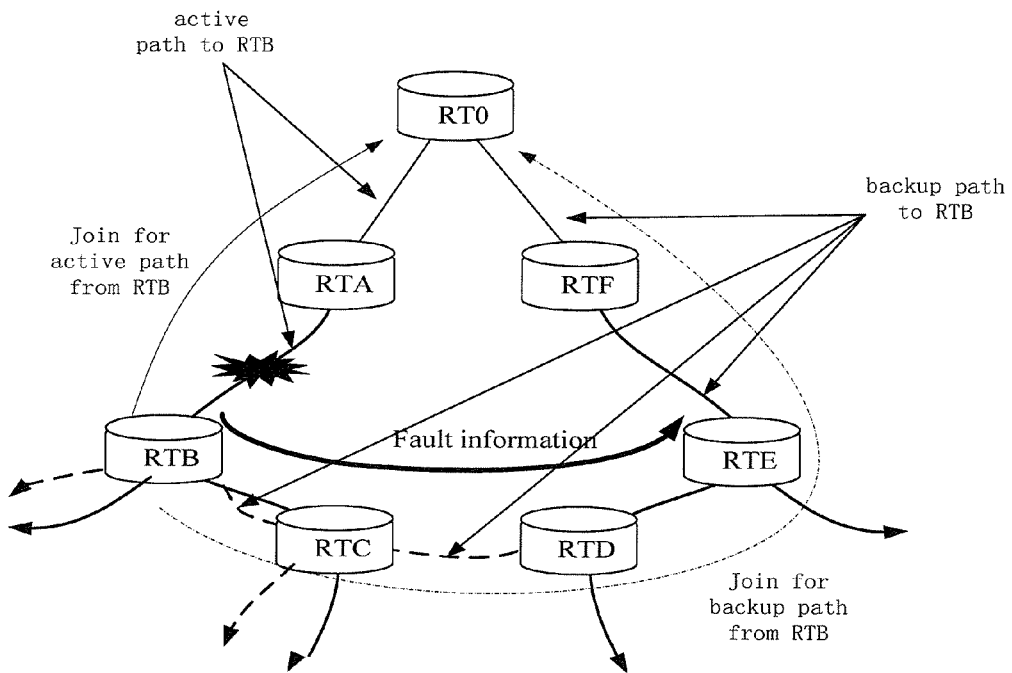
FIG. 3 is a schematic structural diagram of network topology, which is a schematic simplified structural diagram of a typical ring network topology, according to still another embodiment of the present invention.

FIG. 3 is a schematic structural diagram of a network topology, which is a schematic simplified structural diagram of a typical ring network topology, according to still another embodiment of the present invention. In a normal situation, every router on the ring may receive a multicast join message, may use an active path (identified by a solid line) to forward multicast traffic, transfer, in a reverse direction, a backup join packet including a join attribute, and establish a standby path (identified by a dotted line). For example, a backup inbound interface of an initiating point of the standby path may be statically designated, and the backup inbound interface of the initiating point of the standby path may also be generated according to an IP FRR algorithm of unicast. The backup path is from an initiating node of the backup path to a multicast root node or a convergence node of the active path and the standby path. When a fault occurs in a link between an RTA and an RTB on the ring, the RTA learns that a primary outbound interface is faulty, and sends fault information to an upstream router. In the network topology of an example shown in FIG. 3, because the RTA is not connected to another router, the RTA is not described hereinafter. The RTB learns the fault information of the primary inbound interface, sends the fault information notifying the active path. For example, the RTB may flood an entire network with the fault information. The fault information is transferred along RTC-RTD-RTE-RTF, and the fault information includes a primary inbound interface identifier of the RTB. The RTB is set to that it may forward the traffic toward a backup inbound interface of the RTC. After receiving the fault information, the RTC is aware of an RTB active path fault, opens a backup outbound interface toward the RTB, and meanwhile, finds that the primary inbound interface identifier in the fault information is a primary inbound interface on a path from the RTC to a multicast source. The RTC is set to that it may forward the traffic toward a backup inbound interface of the RTD. The RTD receives the fault information, opens a backup outbound interface corresponding to the fault information, and forwards the traffic through the backup outbound interface. The RTE receives the fault information, and does not perform path switchover because it does not receive backup joining that includes active path information of the RTB and the RTC. Finally, the multicast traffic is forwarded by the RTD to the RTC, and is then forwarded to the RTB.

Figure 4A:
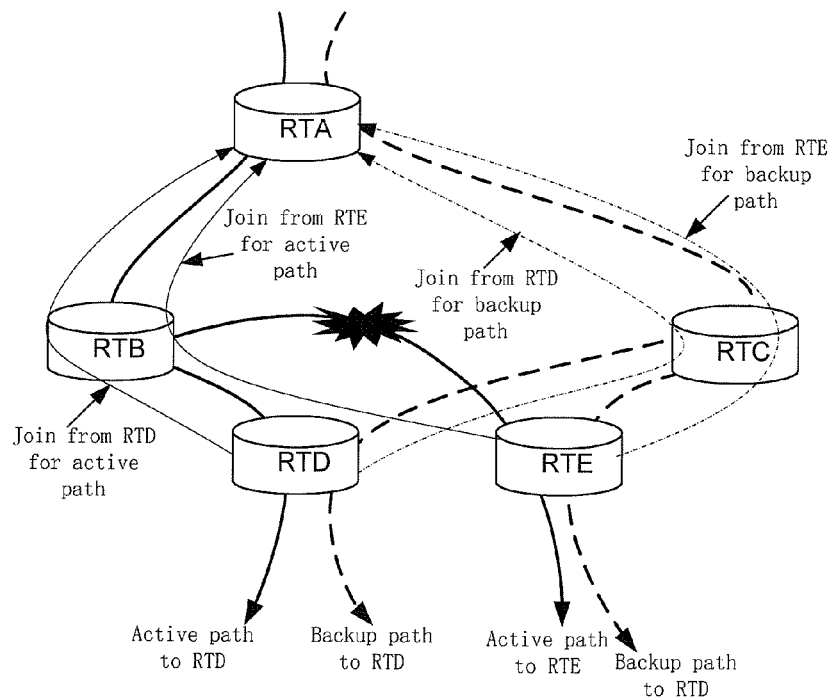
FIG. 4A is a schematic simplified structural diagram of a network topology according to yet another embodiment of the present invention.
Figure 4B:
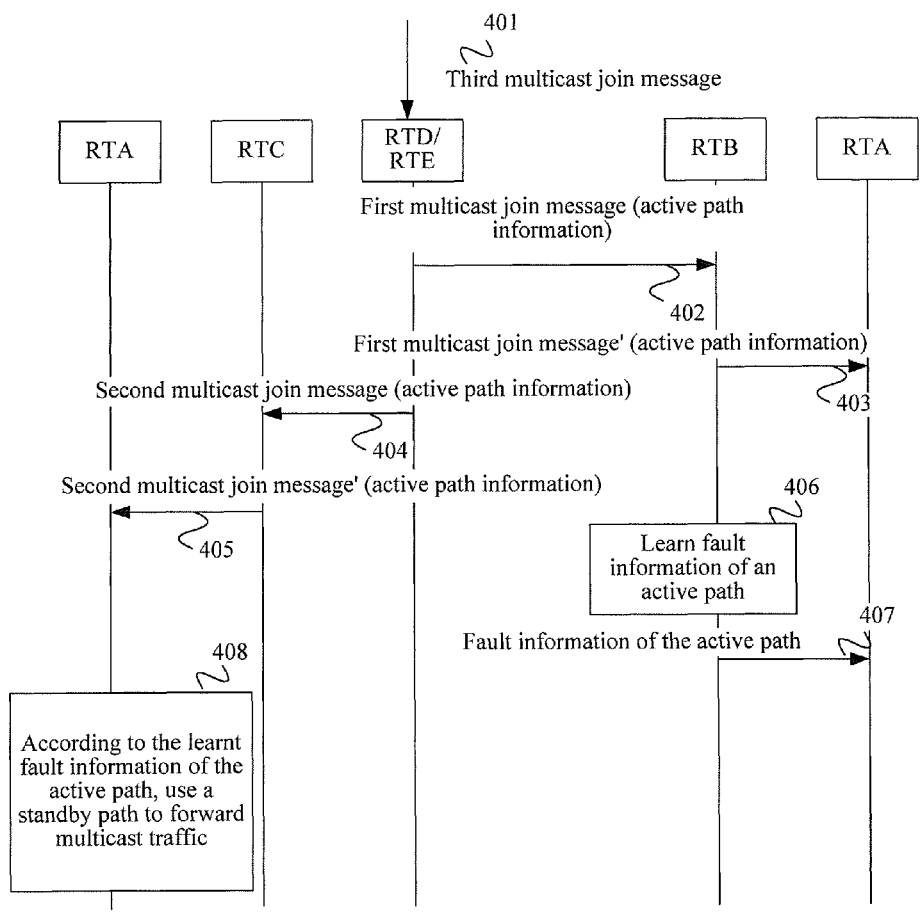
FIG. 4B is a schematic flow chart of a method for forwarding multicast traffic according to yet another embodiment of the present invention.

FIG. 4A is a schematic simplified structural diagram of a network topology according to yet another embodiment of the present invention. An RTD and an RTE are initiating points of a standby path. An RTC, that is, an upstream router of the RTD and the RTE on the standby path, is an intermediate node of the standby path. An RTA, that is, an upstream router of the RTC on the standby path, is a terminating node of the standby path. An RTB, that is, an upstream router of the RTD and the RTE on an active path, is an intermediate node of the active path. The RTA, that is, an upstream router of the RTB on the active path, is a root node of the active path and the standby path. For example, the root node may be a merge point of an active/standby tree, or is a router directly connected to a source, or is designated by a user. FIG. 4B is a schematic flow chart of a method for forwarding multicast traffic according to yet another embodiment of the present invention. As shown in FIG. 4B, the method for forwarding multicast traffic in this embodiment may include:

401 to 403: The RID and the RTE receive a third multicast join message, send a first multicast join message and a first multicast join message' to the RTA.

For example, after receiving the third multicast join message, the RTD and the RTE may establish an active path according to a process in the prior art. For another example, after receiving the multicast join message, the RTD and the RTE add active path information, for example, a tree identifier (Tree ID), so as to form the first multicast join message, send the first multicast join message to an upstream router, and establish the active path. The active path is used to forward multicast traffic. A procedure of establishing the path is not repeatedly described here. The active path established here is an active tree.

404: The RTD and the RTE send a second multicast join message to the RTC.

For example, the second multicast join message may carry the active path information, for example, a tree identifier (ID).

The second multicast join message including the active path information may be implemented by using an RFC5384 specification to newly define a join attribute in a PIM join packet. The join attribute may be included in a source address in the PIM join packet. FLAG is used to identify whether the joining is active/standby joining. A format of the join attribute may be shown as follows:

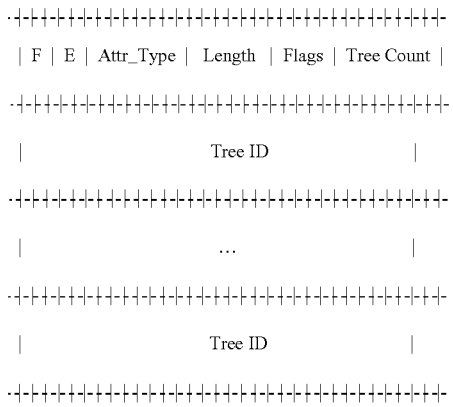

For example, a flag bit F, a flag bit E, an attribute type (Attr_Type), and length (Length) are all defined by using a protocol standard, which are not repeatedly described here. The Attr_Type identifies that the attribute is PIM joining that includes the tree ID. A flag bit Flags is content of the attribute, and at present only one bit is used. 1 is used to represent PIM backup joining, and 0 is used to represent a PIM primary join packet. Tree Count identifies the number of Tree IDs, and the Tree ID identifies active tree information.

For example, according to a definition of the RFC5384 specification, before sending the PIM join packet including the join attribute, a router needs to first negotiate with a neighbor about whether to support processing of the PIM joining that includes a tree ID attribute. The negotiation is recognized through a periodic PIM Hello packet of the router. If a Hello packet sent by a neighboring router does not include a Hello option of the PIM extended attribute, the PIM joining that includes the tree ID attribute is not continually sent. A format of the Hello option of the PIM extended attribute may be shown as follows:

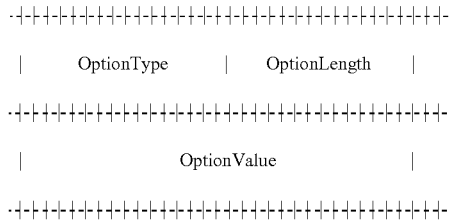

An option type (OptionType) identifies that the Hello option is a newly defined Hello option of a PIM backup join attribute. Option length (OptionLength) identifies length of the Hello option with byte as a unit. At present, the length of the hello option is fixed as 8 bytes. An option value (OptionValue) is a reserved length of 8 bytes, which is not used at present and is set as 0 in sending.

For example, a structure of the tree ID attribute is consistent with that of the backup join attribute mentioned in the foregoing method, and they may be uniformly defined as one attribute.

405: The RTC judges that a multicast entry created when the second multicast join message is received does not exist, and continues to forward a second multicast join message' to the RTA. The RTA is the root node of the active/standby tree, and does not continue to send a multicast join message to an upstream router, and an outbound interface receiving the second multicast join message' does not forward the multicast traffic.

Up to now, establishment of the standby path is completed. In a situation that the active path is normal (a fault does not occur), none of routers on the standby path forwards the multicast traffic through a backup interface.

406: When a fault occurs in a link between the RTB and the RTE, the RTB may detect the downstream link fault through a fault detection technology, and learn fault information of the active path.

Alternatively, when a fault occurs in the link between the RTB and the RTE, the RTE may also detect the upstream link fault through the fault detection technology, and learn the fault information of the active path.

407: According to all tree IDs carried in a join packet received by a primary outbound interface, the RTB releases fault information of the active tree, where the fault information of the active tree includes this tree ID. That is, the RTB sends the fault information of the active tree to the root node RTA of the active/standby tree, so that the RTA opens a corresponding backup tree to forward the multicast traffic.

Alternatively, according to all tree IDs carried in a join packet sent by a primary inbound interface, the RTE releases the fault information of the active tree, where the fault information of the active tree includes this tree ID. That is, the RTE sends the fault information of the active tree to the root node RTA of the active/standby tree, so that the RTA opens the corresponding backup tree to forward the multicast traffic.

For example, the fault information of the active path may be sent to the root node RTA of the active/standby tree in the following various manners.

A. The RTE or the RTB floods routers in an entire network with the fault information.

In this solution, the fault information of the active path may flood the entire network configured with a fault detection and transfer interface, until the fault information of the active path is forwarded to the root node, that is, the router RTA.

B. The RTB transfers the fault in a direction along the root node of the active tree according to a preset fault transfer policy.

C. The RTE transfers the fault in a direction along a leaf of the active tree according to a preset fault transfer policy, and after the fault reaches the leaf, the fault is then transferred to the root node along the backup tree.

For example, the transfer of the fault information may be implemented by extending a fault detection protocol. A source address and path information may be added. Taking a BFD protocol as an example, the protocol needs to be extended as follows:

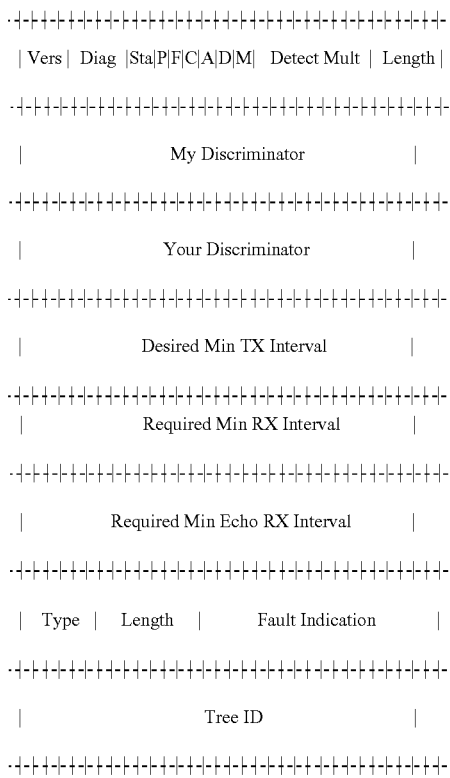

A version number (Version) identifies a version. Because a BFD packet is extended, the version number needs to be redefined. Type is a type definition. Length is length of an extended part. Fault Indication is a cause for the fault, and is not used at present. Tree ID identifies active tree information. Coding formats of content of other parts are defined according to an RFC5880 standard.

408: According to the learnt fault information of the active path, the RTA uses the standby path to forward the multicast traffic, where the standby path is a standby tree.

For example, after receiving the fault information, the RTA determines a corresponding backup outbound interface according to the tree ID carried in the fault information, and forwards the multicast traffic through the backup outbound interface. The primary outbound interface stops forwarding the multicast traffic. According to the learnt fault information of the active tree, the RTE and the RTD receive, through a backup inbound interface, the multicast traffic and forward the multicast traffic downward. Optionally, if the RTE and the RTD do not receive the multicast traffic through a primary inbound interface, the traffic received by the backup inbound interface is continually forwarded downward.

It should be noted that, for brevity of description, the foregoing method embodiments are described as a series of actions. However, those skilled in the art should know that the present invention is not limited to the order of the described actions, because according to the present invention, some certain steps may adopt other orders or be performed simultaneously. Secondly, those skilled in the art should also understand that the described embodiments all belong to exemplary embodiments, and the involved actions and modules are not necessary for the present invention.

In the foregoing embodiments, the description of each embodiment has its emphasis, and reference may be made to the relevant description of other embodiments for the part that is not described in detail in a certain embodiment.

Figure 5:
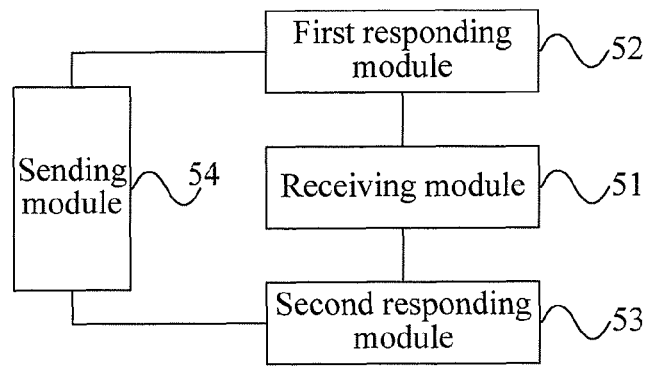
FIG. 5 is a schematic structural diagram of an apparatus for forwarding multicast traffic according to an embodiment of the present invention.

FIG. 5 is a schematic structural diagram of an apparatus for forwarding multicast traffic according to an embodiment of the present invention. As shown in FIG. 5, the apparatus for forwarding multicast traffic in this embodiment may include a receiving module 51, a first responding module 52, a second responding module 53, and a sending module 54. The receiving module 51 receives a third multicast join message. The first responding module 52 sends a first multicast join message to a first upstream router in response to the third multicast join message, and establishes an active path. The second responding module 53 sends a second multicast join message to a second upstream router in response to the third multicast join message, and establishes a standby path. The sending module 54 sends multicast traffic to the multicast receiver through the active path, where the standby path does not forward the module, configured to the multicast traffic.

The method in the foregoing first embodiment of the present invention may be implemented by the apparatus for forwarding multicast traffic provided in this embodiment of the present invention.

According to this embodiment, the standby path that does not forward the multicast traffic is established beforehand by the second responding module. Because the standby path does not forward the multicast traffic when the active path normally forwards the multicast traffic, double network bandwidth is not occupied, thereby saving the network bandwidth.

Figure 6:
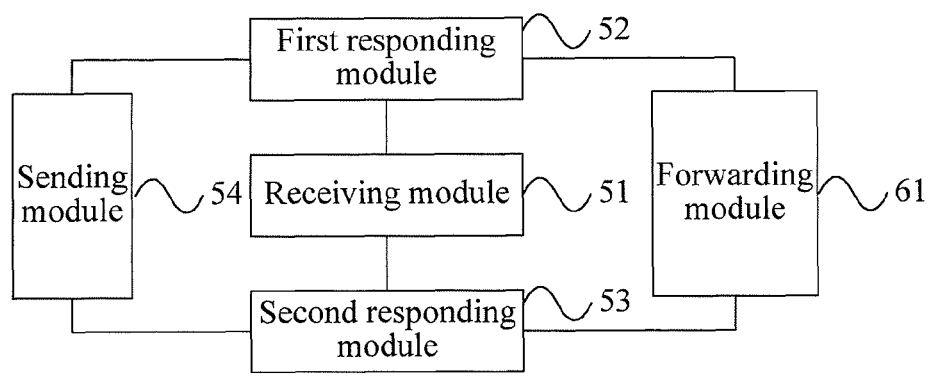
FIG. 6 is a schematic structural diagram of an apparatus for forwarding multicast traffic according to another embodiment of the present invention.

FIG. 6 is a schematic structural diagram of an apparatus for forwarding multicast traffic according to another embodiment of the present invention. As shown in FIG. 6, compared with the previous embodiment, the apparatus for forwarding multicast traffic in this embodiment may further include a forwarding module 61, configured to forward the multicast traffic through the standby path when a fault occurs in the active path.

According to this embodiment, the standby path that does not forward the multicast traffic is established beforehand through the second responding module, so that when a fault occurs in the active path established by the first responding module, the forwarding module can use the standby path established beforehand to forward the multicast traffic. Because the standby path does not forward the multicast traffic when the active path normally forwards the multicast traffic, double network bandwidth is not occupied, thereby saving the network bandwidth.

Various specific solutions described in the foregoing method embodiments are all applicable to the apparatus embodiments, which are not repeatedly described here.

Persons of ordinary skill in the art may understand that all of or part of the steps of the foregoing methods embodiments may be completed by a program instructing relevant hardware. The program may be stored in a computer readable storage medium. When the program is executed, the steps of the method embodiments are executed. The storage medium may be any medium that may store program codes, such as a ROM, a RAM, a magnetic disk, or a compact disk and so on.

Finally, it should be noted that the foregoing embodiments are merely used for describing the technical solutions of the present invention, but are not intended to limit the present invention. Although the present invention is described in detail with reference to the foregoing embodiments, persons of ordinary skill in the art should understand that they may still make modifications to the technical solutions recorded in the foregoing embodiments, or make equivalent replacements to part of the technical features, while such modifications or replacements do not make the nature of corresponding technical solutions depart from the spirit and scope of the technical solutions of the embodiments of the present invention.

What is claimed is:

1. A method for forwarding multicast traffic, the method comprising:
   receiving, by a first node, a first multicast join message;
   in response to receiving the first multicast join message, establishing, by the first node, a primary path from the first node to a second node;
   receiving, by the first node, a second multicast join message carrying path information of the primary path;
   in response to receiving the second multicast join message, establishing a secondary path from the first node to the second node;
   sending, by the first node, a first multicast packet through the primary path without sending the first multicast packet through the secondary path;
   receiving, by the first node, fault information comprising the path information of the primary path; and
   sending a second multicast packet through the secondary path in response to the received path information of the primary path.

2. The method according to claim 1, wherein the path information of the primary path comprises an identifier of an inbound port of a node on the primary path.

3. The method according to claim 1, wherein the primary path is a tree and the information of the primary path comprises an identifier of the tree.

4. An apparatus for forwarding multicast traffic, the apparatus comprising:
   a first module, configured to receive a first multicast join message and establish a primary path from the apparatus to another apparatus;
   a second module, configured to receive a second multicast join message and establish a standby path from the apparatus to the other apparatus;
   a sending module, configured to send a first multicast packet through the primary path without sending the first multicast packet through the standby path; and
   a receiving module, configured to receive faulty information comprising the path information of the primary path, wherein the sending module is configured to send a second multicast packet through the standby path in response to the received path information of the primary path.

5. The apparatus according to claim 4, wherein the path information of the primary path comprises an identifier of an inbound port of a node on the primary path.

6. The apparatus according to claim 4, wherein the primary path is a tree and the information of the primary path comprises an identifier of the tree.

* * * * *